Figure 1:
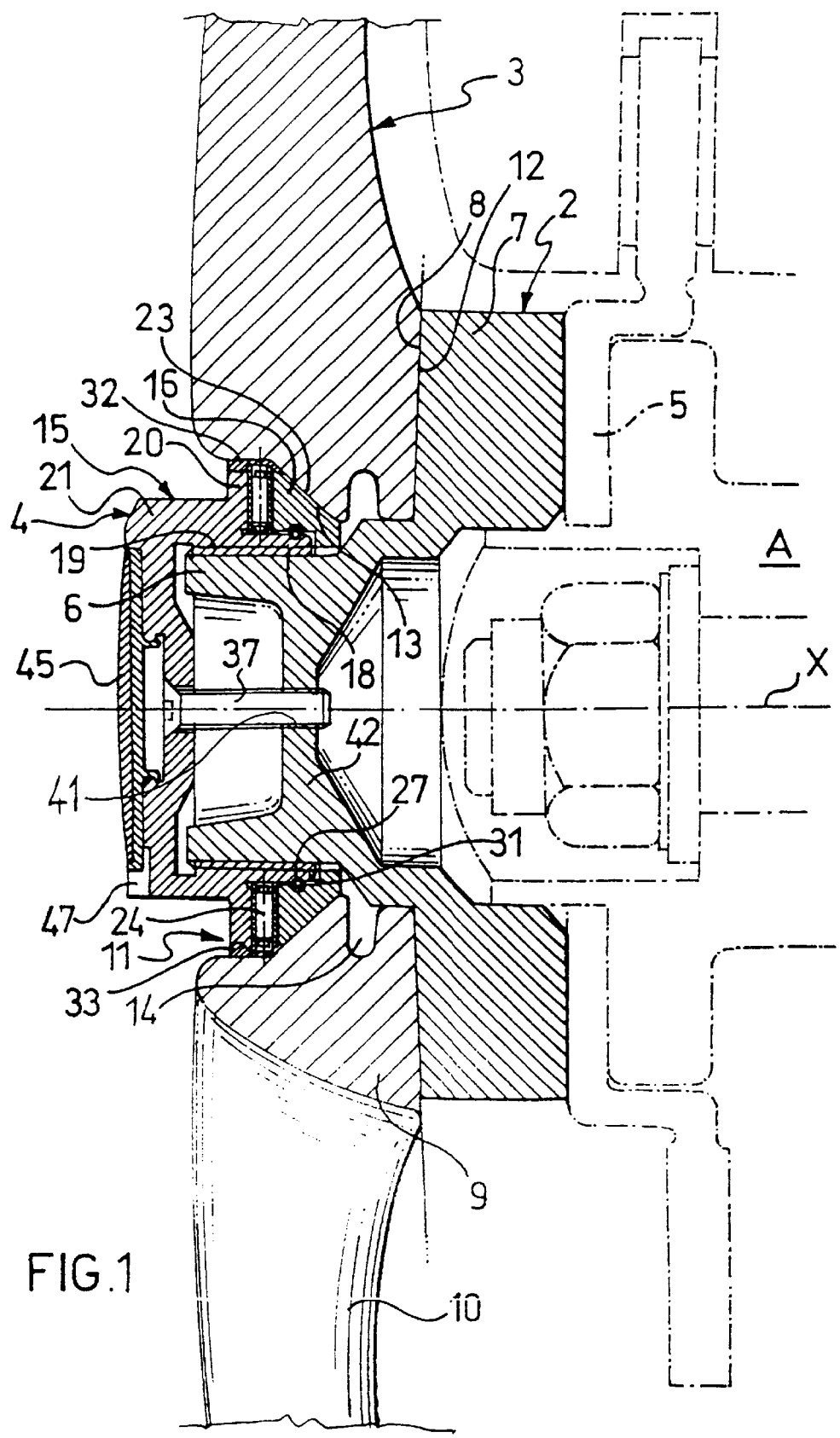

United States Patent [19]
Gandellini

[11] Patent Number: 6,106,076
[45] Date of Patent: Aug. 22, 2000

[54] SINGLE-NUT LIGHT-ALLOY WHEEL ASSEMBLY FOR AN AUTOMOTIVE VEHICLE

[75] Inventor: Giacomo Gandellini, Longhena, Italy

[73] Assignee: Toora S.R.L., Paolo D-Argon, Italy

[21] Appl. No.: 09/117,975

[22] PCT Filed: Feb. 28, 1996

[86] PCT No.: PCT/IT97/00036

§ 371 Date: Mar. 4, 1999

§ 102(e) Date: Mar. 4, 1999

[87] PCT Pub. No.: WO97/31791

PCT Pub. Date: Sep. 4, 1997

[51] Int. Cl.[7] .................................................. B60B 27/00
[52] U.S. Cl. ...................................... 301/35.55; 301/35.63
[58] Field of Search ............................ 301/35.55, 35.58, 301/35.63, 105.1, 111

[56] References Cited

U.S. PATENT DOCUMENTS

| | | |
|---|---|---|
| 1,299,400 | 4/1919 | Budd ...................................... 301/35.58 |
| 1,368,473 | 2/1921 | Beatty . |
| 2,046,779 | 7/1936 | Hack ...................................... 301/35.58 |
| 4,591,211 | 5/1986 | Browning et al. . |
| 5,211,448 | 5/1993 | Hyashi ................................... 301/35.55 |

FOREIGN PATENT DOCUMENTS

| | | |
|---|---|---|
| 1514965 | 3/1968 | France ................................. 301/35.63 |
| 477186 | 10/1953 | Italy ..................................... 301/35.63 |
| 253548 | 11/1948 | Switzerland . |
| WO 92/04549 | 3/1992 | WIPO . |
| WO 93/09355 | 5/1993 | WIPO . |
| WO 94/03736 | 2/1994 | WIPO . |
| WO 95/05291 | 2/1995 | WIPO . |

*Primary Examiner*—Russel D. Stormer
*Attorney, Agent, or Firm*—Merchant & Gould P.C.

[57] ABSTRACT

In the single-nut wheel assembly (1) the mutual contact surfaces (13, 23) between the nut (4) and the hub (3) do not rotate against each other during rotation of the nut (4). For this purpose, the nut (4) (or as an alternative the rim (3)) is provided in two bodies (15, 16) free to rotate mutually thanks to the interposition of antifriction means (17). The force necessary for tightening and loosening the nut is thus reduced.

5 Claims, 2 Drawing Sheets

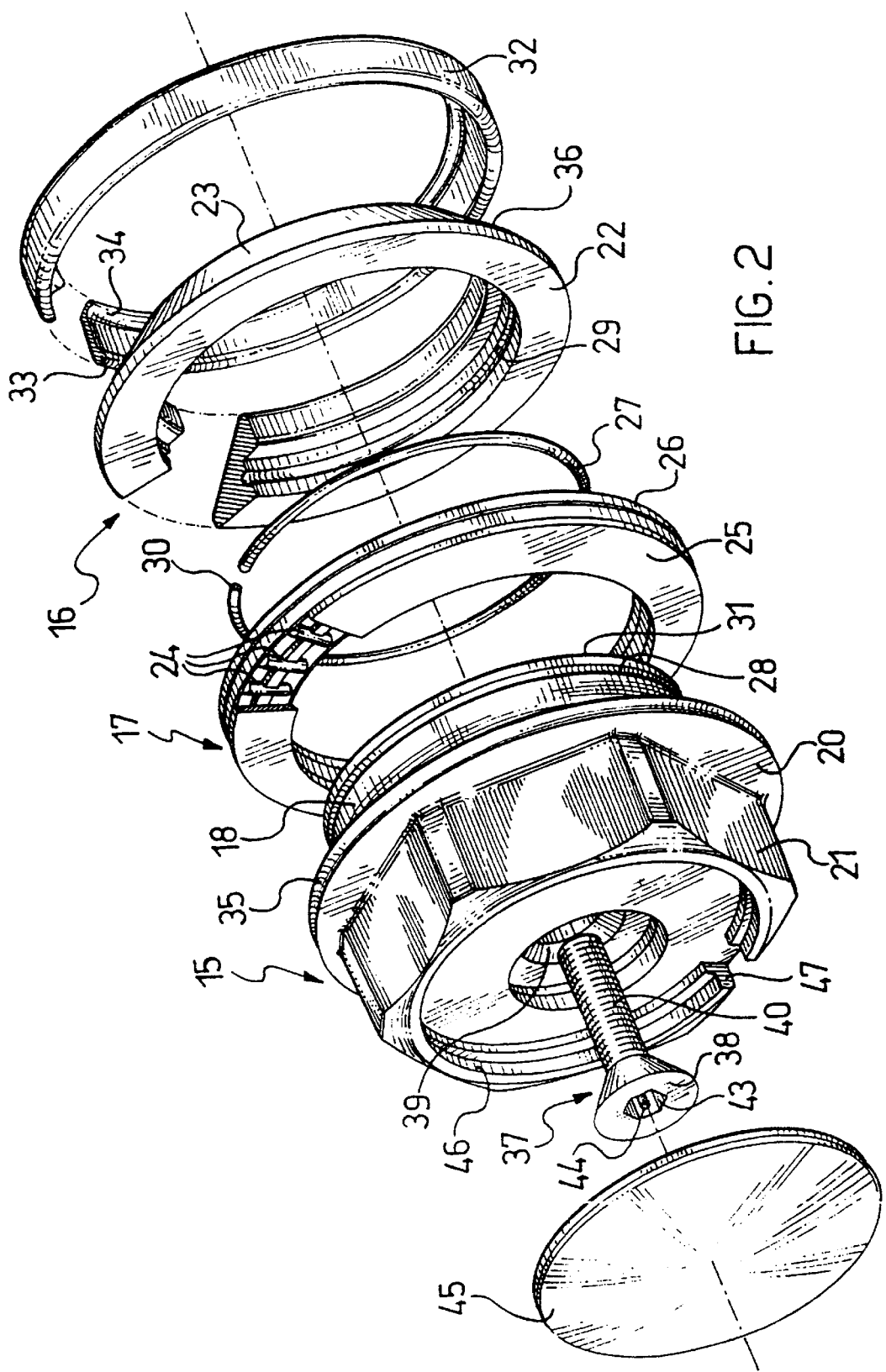

SINGLE-NUT LIGHT-ALLOY WHEEL ASSEMBLY FOR AN AUTOMOTIVE VEHICLE

The present invention relates to a single-nut light-alloy wheel assembly for an automotive vehicle.

In so-called single-nut light-alloy wheels the hub, rim and nut are arranged coaxially with an axle of the wheel. For this purpose the hub comprises an axial pin provided with an external threading and a contact surface for the rim arranged in an annular manner around the pin. The rim comprises in turn a contact surface for the hub and a contact surface for the nut. The latter comprises lastly an axial internal threading for engagement with the threaded pin of the hub, a driving head for rotating operation and a contact surface for the rim.

The use of single-nut wheels is no longer limited to competition vehicles but is spreading also to touring automotive vehicles whose sporting features it is sought to accentuate. This spreading is increased in particular thanks to the provision of adaptation kits permitting installation of single-nut wheels even on vehicles equipped with multi-nut hubs by making use of interface false hubs suited on the one hand to assembling on multi-nut hubs and on the other hand to receiving single-nut rims. On this matter see WO95/05291.

Assembly and disassembly of a single-nut wheel are the critical aspects which have conditioned spreading. Indeed, while in competition use the speed with which it is possible to complete wheel changing is appreciated, in touring use the great torque which it is necessary to apply to the nut either to tighten or loosen it is unwelcome. This shortcoming is only partly attenuated by special wrenches with extensible arm (70 cm or more) supplied as standard equipment to the purchasers of single-nut wheels.

Disassembly is particularly critical and especially if performed after very long use of the wheel. There have been cases in which, with only the torque applicable through the wrench supplied, loosening proved virtually impossible because of seizure between the nut and the rim caused probably by imperceptible positioning errors during assembly, errors which cause very small play between the mating surfaces, or by the formation of oxide between the parts (the surfaces of the nut and the rim in mutual contact cannot be protected with paint).

The problem underlying the present invention is to provide a single-nut wheel assembly in which tightening and loosening of the nut would be made easier.

Consequently, the present invention relates to a single-nut light-alloy wheel assembly for an automotive vehicle comprising a hub born by the automotive vehicle, a rim and a nut for fixing the rim on the hub, wherein the hub, the rim and the nut are arranged coaxially along an axis of the wheel assembly and wherein:

the hub comprises:
  an axial pin threaded externally, and
  a contact surface for the rim arranged in an annular manner around the pin;
the rim comprises:
  a contact surface for the hub, and
  a contact surface for the nut; and
the nut comprises:
  an axial internal threading for engagement with the threaded pin of the hub,
  a driving head for rotating operation, and
  a contact surface for the rim;
characterized in that it comprises means for allowing the contact surface of the rim for the nut and the contact surface of the nut for the rim to not rotate against each other during rotation of the nut.

Indeed, it has been observed that the rim is held in correct position by the axial thrust exerted on it by the tightened nut and by the resulting sliding friction with the hub between the respective contact surfaces in mutual contact. In addition it has also been observed that accidental loosening of the nut once tightened is prevented by the sliding friction between the mutually engaged threading of the nut and the hub and this friction which is also caused by the axial thrust between the nut and the hub. The axial thrust between the nut and the hub is thus the real purpose of tightening the nut.

Viceversa, it has been observed that the sliding friction between the nut and the rim does not provide any effective contribution to holding the rim in position nor does it prevent accidental loosening of the nut while it is the cause of an often predominant part of the torque necessary for tightening or loosening the nut. The positive effect in this sense that can be noted upon a superficial examination of the situation is indeed only apparent. Indeed, all the torque absorbed by the friction between the nut and the rim during tightening is torque subtracted from overcoming the sliding friction on the threading and from generation of axial thrust on the rim. The higher the friction between the nut and the rim the greater will be the part of the tightening torque subtracted from generation of axial thrust.

Thanks to a construction in accordance with the present invention, during tightening (and loosening) there does not occur any mutual sliding between the nut and the rim on the respective contact surfaces and hence the torque absorbed by the friction between these surface is null. In addition, the absence of sliding prevents any seizure phenomena, and makes sure that any formation of oxide is not an obstacle to loosening of the nut.

The means for allowing the contact surface of the rim for the nut and the contact surface of the nut for the rim not to rotate against each other during rotation of the nut can be provided in various manners.

Preferably the nut comprises:
  a main body in which both the driving head and the internal threading are made,
  an annular contact body on which the contact surface for the rim is made, and
  means of friction reduction placed between the main body and the contact body to give mutual rotating freedom between the main body and the contact body.

As an alternative and reciprocally, the rim comprises:
  a main body in which the contact surface for the hub is made,
  an annular contact body on which the contact surface for the nut is made, and
  means of friction reduction placed between the main body and the contact body to give mutual rotating freedom between the main body and the contact body.

Although both the above alternatives are technically feasible the first alternative appears to be preferable because the nut (normally of steel or in any case a high-strength material) lends itself more easily to being provided in two mutually rotating pieces. The rim on the other hand is normally made of light alloy which is a weaker material and would be able to withstand with greater difficulty the separation into two bodies. In this case it might be necessary to insert a steel portion in the main body of the rim.

Preferably the means of friction reduction consist of a bearing. As an alternative there may be provided merely an appropriate processing of the contact surfaces of the two bodies of the nut (grinding, or better, polishing, or still better, deposit of materials having low friction coefficient such as Teflon™ or equivalent) with or without lubrication.

Preferably, in the wheel assembly:
the main body of the nut comprises:
an axial sleeve, and
a radial flange around the axial sleeve;
the contact body is assembled with play on the axial sleeve and comprises an annular base; and
the bearing is assembled between the radial flange of the main body and the annular base of the contact body.

This construction permits optimal distribution of the forces and facilitates correct operation of the bearing.

The bearing can be of various types, either sliding or rolling. In the former case, to be able to withstand the high axial loads without impairing the reduction of friction, lubrication proves to be appropriate. There is thus preferred a rolling bearing and specifically with radial rollers to ensure both optimal ability to withstand axial loads and great simplicity of use.

Preferably the contact body is permanently locked axially on the axial sleeve by an elastic ring in engagement in respective grooves formed on the axial sleeve and on the contact body.

The permanent locking of the two bodies of the nut one to the other avoids the risk of accidental disassembly of the nut upon removal of the rim and also ensures that the correct operation of the bearing will not be compromised by involuntary tampering by the user or untrained personnel.

Preferably the nut comprises an annular protective cover for the bearing, assembled spanning the main body and the contact body and free to rotate with respect to both bodies. It is thus avoided that in use dirt or dust may be deposited on the bearing, which would make necessary periodic maintenance operations.

Preferably the contact surface of the rim for the nut and the contact surface of the nut for the rim are tapered with and angle with respect to the axis of the wheel assembly between 30° and 60°, and preferably about 45°. The tapered shape facilitates correct assembly of the rim by intrinsically aiding centering.

Further characteristics and advantages of a wheel assembly in accordance with the present invention are better explained in the detailed description of an embodiment thereof given below by way of nonlimiting example with reference to the annexed drawings wherein:

FIG. 1 is a cross section view of a wheel assembly in accordance with the present invention, and FIG. 2 is an exploded view in partial cross section of the nut of the wheel assembly of FIG. 1.

In the Figures, reference number 1 indicates a single-nut light-alloy assembly for an automotive vehicle A (of which are visible in FIG. 1 only some parts near the wheel assembly 1). The wheel assembly 1 comprises a hub 2, a rim 3 and a nut 4. The hub 2 illustrated in FIG. 1 is more correctly an interface false hub applied on the true hub 5 to permit assembly of the wheel by means of a single nut. Greater details concerning this type of device can be found in WO95/05291 by this same applicant. However, since for the purposes of the present invention the false hub 2 is actually the element which, with respect to the rim 3, performs all the functions of the hub, the false hub 2 will be called below merely "hub" while the true hub 5 will not be named anymore.

The hub 2 consists of a single body (normally of forged steel) which comprises a threaded axial pin 6 extending along the axis X of the wheel assembly 1 and directed toward the exterior of the automotive vehicle A, and a flange 7 surrounding the axial pin 6 and extending in a radial manner therefrom. On the hub 2 a contact surface 8 for the rim 3 is formed, made in an annular manner on the flange 7 and oriented towards the exterior of the automotive vehicle A.

The rim 3 comprises a central body 9 connected to a peripheral channel for the tire (neither of which is shown in FIG. 1) by spokes 10. Preferably, in the case of single-nut systems, the rim 3 is provided in a single piece by casting of a suitable light alloy generally based on aluminum. The central body 9 is provided with an opening 11 opposite the axis X for keying of the hub 2 on the pin 6 and a contact surface 12 for the hub 2 made in an annular manner around the opening 11 and oriented towards the interior of the automotive vehicle A.

The rim 3 comprises also a contact surface 13 for the nut 4, made in the opening 11. The contact surface 13 is tapered with an angle with respect to the axis X between 30° and 60° and preferably about 45°, oriented with the ideal vertex of the cone towards the interior of the automotive vehicle A. By angle of the tapered surface is meant (here and in the entire present patent text) the angle included between the axis of the cone and one of its generating lines.

Beneath the contact surface 13 for the nut 4, in the central body 9 of the rim 3 an annular groove 14 is formed to give a certain elastic yield to the rim 3 against loads applied on the contact surface 13.

The nut 4 comprises a main body 15, an annular contact body 16 and a bearing 17 placed between the two bodies to give them mutual rotating freedom.

Specifically the main body 15 comprises in a single piece (preferably steel) an axial sleeve 18 having an internal threading 19 for coupling with the threaded pin 6 of the hub 2, a flange 20 extending in a radial manner around the sleeve 18 and a driving head for rotating operation 21 which may be for example hexagonal.

The contact body 16, which is also in a single piece, has an annular structure and comprises a base 22 and a contact surface 23 for the rim 3. The contact surface 23 is tapered with an angle corresponding to that of the contact surface 13 of the rim 3.

The bearing 17 is preferably a rolling bearing of the type with thrust rollers and suited for withstanding loads in the axial direction. It comprises a series of rollers 24 assembled between two rings 25 and 26. The ring 25 is assembled on the flange 20 of the main body 15 of the nut 4 while the ring 26 is assembled on the base 22 of the contact body 16. The main body 15 and the contact body 16 of the nut 4 are mutually constrained in axial direction by an elastic ring 27 (of the so-called Seger type) in engagement between a groove 28 formed on the axial sleeve 18 of the main body 15 and a groove 29 formed in the contact body 16. The elastic deformability of the elastic ring 27 (made of steel), ensured by a break 30 in its circumference, is such as to allow variations in diameter sufficient to permit assembly thereof, together with an external bevel 31 formed on the end of the sleeve 18, as better explained below.

A protective cover 32, which is annular and preferably made of elastomeric material, surrounds externally the bearing 17 and is fixed spanning the main body 15 and the contact body 16 of the nut 4 in such a manner as to not obstruct their mutual rotation. In particular, the cover 32 is provided with a projection 33 and a lip 34 turned toward the interior. The projection 33 engages in a corresponding groove 35 formed on the external periphery of the flange 20 of the main body 15 while the lip 34 engages in a corresponding groove 36 formed on the external periphery of the contact body 16.

Assembly of the nut 4 of the wheel assembly 1 takes place in the following manner.

First, the bearing 17 is fitted on the main body 15 by resting it on the flange 20 while the elastic ring 27 is inserted in the groove 29 in the contact body 16. Subsequently the contact body 16 is fitted on the sleeve 18 of the main body 15. With a light forcing in the axial direction the bevel 31 causes elastic deformation of the elastic ring 27 (expansion) to permit fitting. After completion of fitting far enough to engage the elastic ring 27 also in the groove 28, the two bodies 15 and 16 can no longer be separated except by destroying the elastic ring 27. The form of the two grooves 28 and 29 is indeed such as to prevent axial forces between the two bodies 15 and 16 from causing expansion or contraction of the elastic ring 27. Assembly of the nut 4 is completed by applying the protective cover 32.

The wheel assembly 1 also comprises an antitheft screw 37 arranged axially along the axis X. The head 38 of the screw 37 engages in a special drilled seat 39 made on the driving head 21 of the nut 4 while the threaded stem 40 engages in a drilled hole 41 formed in a baffle 42 of the axial pin 6 of the hub 2. The head 38 of the screw 37 is provided with a hexagonal recess 43 for rotating operation which is partially obstructed by an axial pin 44. Operation of the screw 37 is hence possible only with a special wrench (not shown) of a form complementary to the recess 43, in practice an axially drilled hexagonal wrench.

The wheel assembly 1 comprises lastly a disc 45 for closing of the nut 4 and inserted under pressure in a special circular seat 46 broken by a recess 47 to permit removal of the disc 45 by means of a common screwdriver.

Assembly and disassembly of the rim 3 on and from the hub 2 take place in a manner fully analogous to the corresponding operations with conventional wheel assemblies.

However, while the nut 4 is being screwed down, the contact surface 23 of the nut 4 does not rotate with respect to the contact surface 13 of the rim 3. Consequently no resistant torque due to friction is generated. In assembly, this means that all the torque applied to the nut 4 is transferred onto the coupling between the internal threading 19 of the nut 4 and the threaded pin 6 of the hub 2 to generate an axial thrust which is discharged onm the rim 3, which is thus pressed with its contact surface 12 against the contact surface 8 of the hub 2.

Viceversa, in disassembly the conditions of the contact surface 23 and the contact surface 13 of the nut 4 and the rim 3 respectively which are in mutual contact cannot generate any resisting torque which would obstruct operation of the nut 4. This proves to be true even in extreme cases such as for example if a sort of cementing because of the formation of oxide had occurred.

Naturally many modifications can be made to the embodiment details of the present invention without thereby going beyond the confines defined by the following claims. In particular, in a worse but still acceptable version it could be provided that the condition of mutual non-rotation between the surfaces of the nut and rim in contact during tightening and loosening of the nut be obtained by making rotational a portion of the rim rather than a portion of the nut.

What is claimed is:

1. Single-nut light-alloy wheel assembly for an automotive vehicle, comprising a hub borne by the automotive vehicle, a rim and a nut for fixing the rim on the hub, wherein the hub, the rim and the nut are arranged coaxially with an axis (X) of the wheel assembly and wherein:

the hub comprises:
an axial pin threaded externally, and
a contact surface for the rim arranged in an annular manner around the pin;

the rim comprises:
a contact surface for the hub, and
a contact surface for the nut; and the nut comprises:
a main body including:
an axial internal threading for engagement with the treaded pin of the hub, and
a driving head for rotating operation;
an annular contact body assembled with play on the main body and having a contact surface for the rim;
a friction reduction bearing placed between the main body and the contact body to give mutual rotation freedom between the main body and the contact body, thus allowing the contact surface of the rim for the nut and the contact surface of the nut for the rim to not rotate against each other during rotation of the nut; and
an elastic ring in engagement in respective grooves formed on the main body and on the contact body, to have the contact body permanently locked axially on the main body.

2. Wheel assembly in accordance with claim 1, wherein:
the main body of the nut comprises:
an axial sleeve, and
a radial flange around the axial sleeve;
the contact body comprising an annular base, and
the bearing is assembled between the radial flange of the main body and the annular base of the contact body.

3. Wheel assembly in accordance with claim 2, wherein the nut comprises an annular protective cover for the bearing, assembled spanning the main body and the contact body and free to rotate with respect to both bodies.

4. Wheel assembly in accordance with claim 1, wherein the bearing is a radial roller bearing.

5. Wheel assembly in accordance with claim 1, wherein the contact surface of the rim for the nut and the contact surface of the rim for the nut and the contact surface of the nut for the rim are tapered with an angle to the axis (X) of the wheel assembly between 30° and 60°.

* * * * *